US011877616B2

(12) United States Patent
Viner et al.

(10) Patent No.: US 11,877,616 B2
(45) Date of Patent: Jan. 23, 2024

(54) SAFETY INTEGRATED PERSONAL MOBILITY VEHICLE

(71) Applicants: Joshua Viner, West Hollywood, CA (US); Jonathan Viner, West Hollywood, CA (US); Matthew Alfin, West Hollywood, CA (US); Jeffrey Kelsoe, West Hollywood, CA (US); Sean Lim, Los Angeles, CA (US); Paul Van Wieren, Los Angeles, CA (US)

(72) Inventors: Joshua Viner, West Hollywood, CA (US); Jonathan Viner, West Hollywood, CA (US); Matthew Alfin, West Hollywood, CA (US); Jeffrey Kelsoe, West Hollywood, CA (US); Sean Lim, Los Angeles, CA (US); Paul Van Wieren, Los Angeles, CA (US)

(73) Assignee: JJC Imports, LLC, West Hollywood, CA (US)

( * ) Notice: Subject to any disclaimer, the term of this patent is extended or adjusted under 35 U.S.C. 154(b) by 442 days.

(21) Appl. No.: 16/823,259

(22) Filed: Mar. 18, 2020

(65) Prior Publication Data

US 2020/0298925 A1    Sep. 24, 2020

Related U.S. Application Data

(60) Provisional application No. 62/909,653, filed on Oct. 2, 2019, provisional application No. 62/875,187, filed
(Continued)

(51) Int. Cl.
*B60W 30/04*    (2006.01)
*B60W 30/08*    (2012.01)
(Continued)

(52) U.S. Cl.
CPC ............ *A42B 3/0466* (2013.01); *A42B 3/006* (2013.01); *A42B 3/10* (2013.01); *A42B 3/30* (2013.01);
(Continued)

(58) Field of Classification Search
None
See application file for complete search history.

(56) References Cited

U.S. PATENT DOCUMENTS 5,025,504 A    6/1991  Benston et al.
5,978,969 A   11/1999  Vinding
(Continued)

FOREIGN PATENT DOCUMENTS

CN    2372932    4/2000
CN  204587117    8/2015
(Continued)

OTHER PUBLICATIONS

"International Application Serial No. PCT/US2020/023444, International Search Report dated Jun. 18, 2020", 2 pgs.
(Continued)

*Primary Examiner* — Todd Melton
(74) *Attorney, Agent, or Firm* — BARNES & THORNBURG LLP; Mark D. Stignani

(57) ABSTRACT

A safety integrated electrically powered vehicle (SIPV) apparatus comprising an electric vehicle further comprising at least an integrated safety control apparatus wherein the integrated safety control apparatus polls a plurality of sensors to detect current SIPV data related to safe use, a communication link to an integrated safety control apparatus to transmit a plurality of data representative of the current use of a SIPV, and receive from the SIPV system at least an instruction received from the integrated safety control apparatus via the communication link to direct a plurality of
(Continued)

control units on the SIPV to modify current operation parameters to bring the SIPV back to a safe use.

7 Claims, 10 Drawing Sheets

Related U.S. Application Data on Jul. 17, 2019, provisional application No. 62/820,039, filed on Mar. 18, 2019, provisional application No. 62/820,005, filed on Mar. 18, 2019, provisional application No. 62/820,013, filed on Mar. 18, 2019.

(51) Int. Cl.

| | |
|---|---|
| *G01C 21/34* | (2006.01) |
| *G06Q 30/0645* | (2023.01) |
| *G06Q 50/30* | (2012.01) |
| *B60L 15/10* | (2006.01) |
| *A42B 3/04* | (2006.01) |
| *A42B 3/10* | (2006.01) |
| *B62J 11/24* | (2020.01) |
| *A42B 3/00* | (2006.01) |
| *B62J 45/20* | (2020.01) |
| *B62J 45/40* | (2020.01) |
| *A42B 3/30* | (2006.01) |
| *H04W 4/00* | (2018.01) |

(52) U.S. Cl.
CPC ............ *B60W 30/04* (2013.01); *B60W 30/08* (2013.01); *B62J 11/24* (2020.02); *B62J 45/20* (2020.02); *B62J 45/40* (2020.02); *G01C 21/3438* (2013.01); *G06Q 30/0645* (2013.01); *A42B 3/0413* (2013.01); *B60L 15/10* (2013.01); *G06Q 50/30* (2013.01); *H04W 4/00* (2013.01)

(56) References Cited

U.S. PATENT DOCUMENTS

| | | | |
|---|---|---|---|
| 9,427,039 B2* | 8/2016 | Eustace | A42B 3/0466 |
| 10,499,699 B2* | 12/2019 | Chen | G06K 7/1417 |
| 11,109,630 B2* | 9/2021 | Penna | G07C 9/00896 |
| 2004/0090338 A1 | 5/2004 | Nishino et al. | |
| 2013/0030657 A1 | 1/2013 | Chatterjee et al. | |
| 2014/0379124 A1* | 12/2014 | Dallaire | A42B 3/0433 700/237 |
| 2015/0008236 A1 | 1/2015 | Mills et al. | |
| 2015/0066267 A1 | 3/2015 | Chun | |
| 2015/0193729 A1 | 7/2015 | Van Wiemeersch et al. | |
| 2015/0245621 A1* | 9/2015 | Stewart | A42B 3/10 2/243.1 |
| 2015/0255994 A1 | 9/2015 | Kesler et al. | |
| 2015/0291253 A1 | 10/2015 | Schieffelin | |
| 2017/0136875 A1* | 5/2017 | Logan | H04W 4/80 |
| 2018/0101998 A1* | 4/2018 | Pierce | B60L 3/0015 |
| 2018/0194421 A1 | 7/2018 | Hines et al. | |
| 2018/0251190 A1 | 9/2018 | Hancock et al. | |
| 2020/0297059 A1 | 9/2020 | Viner et al. | |
| 2020/0298841 A1 | 9/2020 | Viner et al. | |
| 2020/0298925 A1 | 9/2020 | Viner et al. | |
| 2021/0031848 A1* | 2/2021 | Du | B60R 25/32 |

FOREIGN PATENT DOCUMENTS

| | | |
|---|---|---|
| CN | 107767500 | 3/2018 |
| DE | 102011100781 | 12/2011 |
| WO | 2019217187 | 11/2019 |
| WO | 2020191104 | 9/2020 |
| WO | 2020191106 | 9/2020 |
| WO | 2020191108 | 9/2020 |

OTHER PUBLICATIONS

"International Application Serial No. PCT/US2020/023444, Written Opinion dated Jun. 18, 2020", 5 pgs.
"International Application Serial No. PCT/US2020/023446, Invitation to Pay Additional Fees dated May 14, 2020", 2 pgs.
"International Application Serial No. PCT/US2020/023448, Invitation to Pay Additional Fees dated Jun. 2, 2020", 2 pgs.
"International Application Serial No. PCT/US2020/023448, International Search Report dated Jul. 28, 2020", 4 pgs.
"International Application Serial No. PCT/US2020/023448, Written Opinion dated Jul. 28, 2020", 10 pgs.
"International Application Serial No. PCT/US2020/023446, International Search Report dated Jul. 31, 2020", 4 pgs.
"International Application Serial No. PCT/US2020/023446, Written Opinion dated Jul. 31, 2020", 9 pgs.
U.S. Appl. No. 16/823,253, filed Mar. 18, 2020, Safety Integrated Shared Vehicle System and Methods.
U.S. Appl. No. 16/823,257, filed Mar. 18, 2020, Deployable Safety Device Apparatus.

* cited by examiner

SAFETY INTEGRATED PERSONAL MOBILITY VEHICLE

CLAIM OF PRIORITY

This patent application claims the benefit of priority of Viner, et. al, U.S. Provisional Patent Application Ser. No. 62/820,005 filed on Mar. 18, 2019, the benefit of priority of Viner, et. al, U.S. Provisional Patent Application Ser. No. 62/820,013 filed on Mar. 18, 2019, the benefit of priority of Viner, et. al, U.S. Provisional Patent Application Ser. No. 62/820,039 filed on Mar. 18, 2019, the benefit of priority of Viner, et. al, U.S. Provisional Patent Application Ser. No. 62/875,187 filed on Jul. 17, 2019, and the benefit of priority of Viner, et. al, U.S. Provisional Patent Application Ser. No. 62/909,653 filed on Oct. 2, 2019, all of which are hereby incorporated by reference herein in their entireties

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright ©2019 Wheels Inc. All Rights Reserved.

BACKGROUND

The shared vehicle ecosystem has moved from a nascent set of startup companies to a vibrant industry with a number of companies in a large number of markets, each company specializing in short distance rentals of bicycles and powered scooters. The industry has also experienced growing pains in the areas of safety. There have been a number of highly publicized accidents, injuries and deaths of subscribers to these services. Several safety measures have been fielded including rental of safety devices (e.g. traditional bicycle helmets rented or various disposable helmet types). In each case, these half measures have left much to be desired in the areas of helmet sanitation, item loss/theft and validation that the safety device is being used and were ultimately unsuccessful commercially. Additionally, there has been no methodology attached to the shared ride systems deployed that will actively create a safer ride for the rider. In all previous cases, the safety device is not in communication with the shared vehicle, not integrated to the deployment or recovery of the safety device before and after the shared vehicle rental. Additionally, each shared vehicle is not in active communication with the shared ride provisioning system to monitor rides and riders for safety related behaviors. Additionally, all the previous safety devices also rely heavily on a direct human involvement (helmet rental/recovery by a human) (sanitation and restocking by a human) and there was virtually no ability to prevent a rider from ignoring the use of a safety device.

BRIEF SUMMARY

The present inventors have recognized, among other things, that a problem to be solved can include minimizing the labor involved in deploying safety devices with a shared ride system. Another aspect of the problem solved is the integration of safety system, sensors and user safety devices into the actual design of the personal mobility vehicle. Another aspect of the problem solved is the ongoing upkeep and maintenance of personal mobility vehicles (shared vehicles) by web enabled servicing of the invention. A third aspect of the problem solved is the integration of service items with the integral safety sensors and interconnects in the described solution. A fourth aspect of the problem solved is the closed loop monitoring of safety protocols from sensors in the personal mobility vehicle components, the safety equipment worn by the user, mobile devices of the user, and the vehicle management/servicing protocols.

The present subject matter provides a solution to these problems, such as by using integrally designed safety devices associated or integrated with a personal mobility vehicle that a) are deployed within the shared vehicle, b) are communicatively coupled to the vehicle, c) coupled to the system as a whole, which is in constant communication between the vehicle, the shared vehicle management system, and the various safety devices, thereby integrating safety and serviceability in the design of the shared vehicle. that interacts with the user who is using the various safety checks during a ride, d) the retrieval of any deployed user safety devices, and e) the verified sanitation of any deployed user safety devices, and f) the reset of any user safety device to be ready for the next user. By accomplishing these integrations, the present solution comprises a number of aspects where the solution can jointly validate a user to use the personal mobility vehicle, deploy the personal mobility vehicle, manage the deployment of a wearable user safety devices at the time of rental, validate the use of the helmet, monitor the use of a helmet by a shared vehicle renter during the rental, monitor the personal mobility vehicle during the rental, and the retrieval and sanitization of the helmet without the intervention of a servicing personnel allowing the immediate redeployment of the shared vehicle with the same wearable safety device, as well as detecting whether a user is safely using the shared vehicle. The present solution can additionally monitor the safety state of a user during a ride by use of additional sensors on the personal mobility vehicle.

Each of these non-limiting examples can stand on its own or can be combined in various permutations or combinations with one or more of the other examples.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

SYSTEM LEVEL DESCRIPTION

The example used in this description is intended as a median example of the solution proposed, rather than an exhaustive example of every permutation of this proposed solution. It can be appreciated that the recombination of the various aspects of this solution may result in many permutations.

Figure 1:
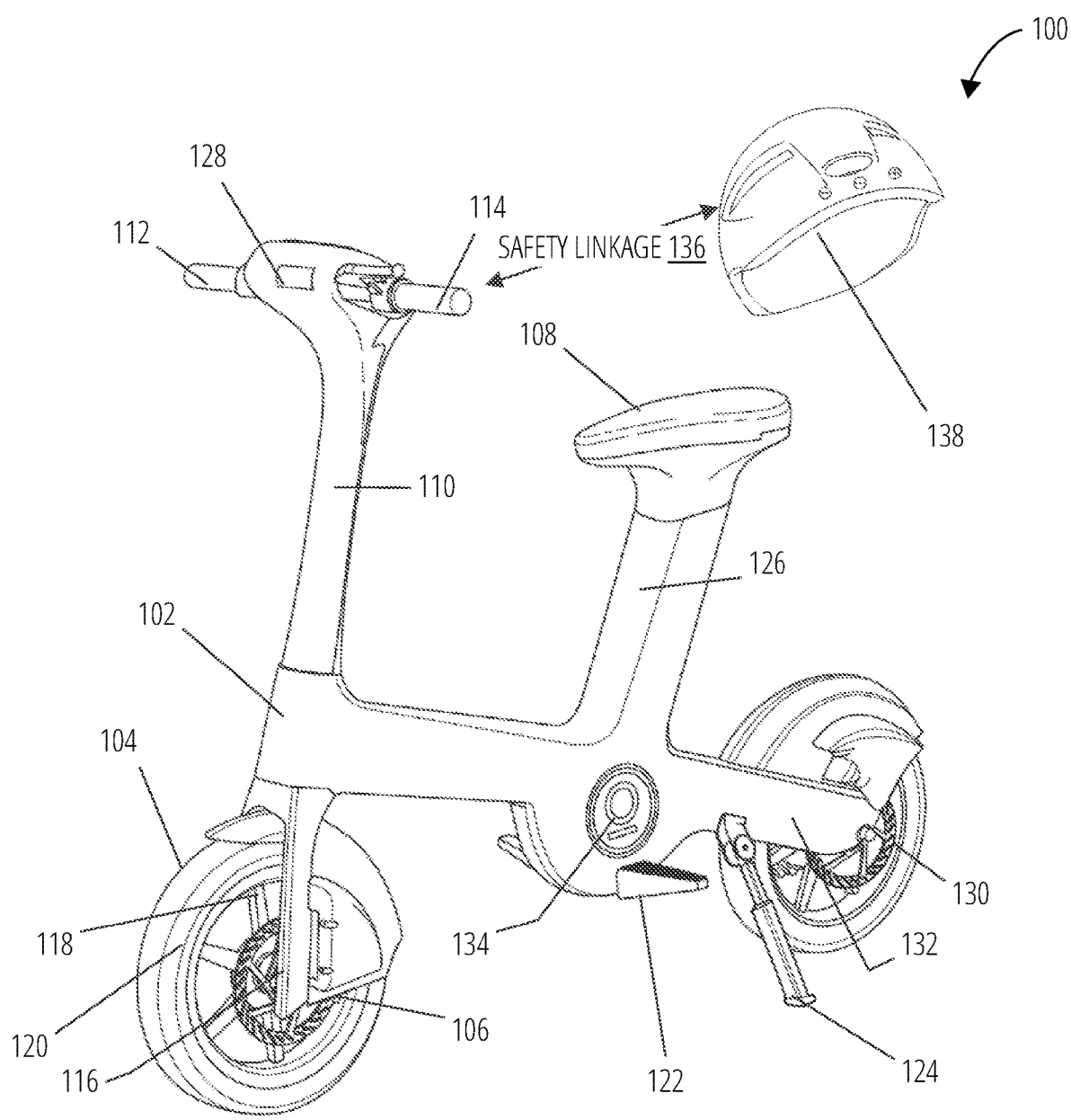
FIG. 1 is an example of a safety integrated electrically powered vehicle (SIPV) disclosed herein.

The safety enabled personal mobility vehicle or safety integrated electrically powered vehicle (SIPV) 100 is shown in FIG. 1. The SIPV 100 comprises a substantially rigid frame 102 with at least two wheels 104 mounted to the frame 102 supporting a seat 108 for at least a single user of the SIPV 100 and an articulated steering column 108 mounted to at least one of the wheels 104. The wheel 104 further comprising a wheel hub 116, spokes 118, a wheel rim 120 and tire 106, the wheel 104 in front being rotatably articulated for steering with the articulated steering column 108 further comprising a set of handles 110 extending at a substantially perpendicular orientation from the articulated steering column 108 with each handle 110 set at a height for a user to steer the SIPV 100 while riding the SIPV 100. The SIPV may have several configurations for a user, sitting or standing on the SIPV 100, FIG. 1 depicts a seated version. The handle 110 includes an acceleration control 112 and a handle brake control 114 operably connected to the wheel hub 116 that houses a brake 130 in at least one or more of the wheels 104. The frame 102 further comprises footrests 122, light 128, a drive apparatus 132 operably connected to the acceleration control 112 that propels the wheels 104 (e.g., via a gear set or indirect/direct drive), a power source interface. Although not illustrated in FIG. 1, the SIPV 100 can also include other components that are integrated into the SIPV 100. (e.g. Camera, an Accelerometer, among other sensors)

The frame 102 can vary depending on the implementation and can be fabricated using a number of materials. In this variant of the solution in FIG. 1, the frame 102 has an open design to ensure that the SIPV 100 is compatible with all types of clothing. The frame 102 allows for a comfortable upright riding position allowing the rider to sit on seat 108, resting on foot rests 122 and allowing the SIPV 100 to be parked on a kickstand 124 The drive apparatus 132 is located in this version of the solution in the back wheel hub 116. A safety linkage 136 is wirelessly connected to the safety device 138 to link it to the SIPV 100 to allow the SIPV 100 to enforce the use of a safety device 138. For the sake of clarity, this variant of the solution focuses on use of a helmet as a safety device 138, however the solution contemplates dispensation or deployment of other safety device types as well (e.g. Debris protection, other joint protection as well as rash protection)

The tires on the wheel 104 can be made from a solid or puncture resistant material. The wheels 104 are secured to the frame 102 using standard components (e.g., nuts). In general, the SIPV 100 can be made from unique parts (e.g., nuts and screws) having sizes to help deter theft. For instance, the nuts and screws that are part of the SIPV 100 can be designed such that they can only be opened with proprietary interfaces. The SIPV 100 also further comprises usage of electronically triggered latches (e.g. BlueTooth® interfaces as described later in this description).

The wheel hub 116 houses the brake 130 and/or drive apparatus 132 in some variants of the solution. The internal wheel hub 116 can keep the wiring for brakes and gears enclosed and hidden. The brake 130 can include front and rear drum brakes operably connected to the handle brake control 114 and the acceleration control 112 operably attached for the drive apparatus 132. Other types of brakes such as disk, cantilever, and V-brakes may also be used.

The light 128 can further comprise at least a multiple LED lights powered by the power source 302 mounted internally in the seat post 126. The power source 302 will be introduced later in FIG. 3. The light 128 can be replicated anywhere on the SIPV 100 to help provide visibility at night. In addition, lighted or reflective surfaces can also be applied to Logo zones on wheels, pedals, and on other visible areas of the SIPV 100 to enhance the solution branding and safety. An example of this feature is the power indicator 134 in FIG. 1.

The seat post 126 can also be an adjustable height that allows the height of the seat 108 to be adjusted. The quick release feature of the seat post 126 is designed to allow easy height adjustments without making it possible to completely remove the post. A numbering system on the seat post 126 can help frequent users adjust the height of the seat 108 quickly to the pre-set height that the rider desires.

Figure 2:
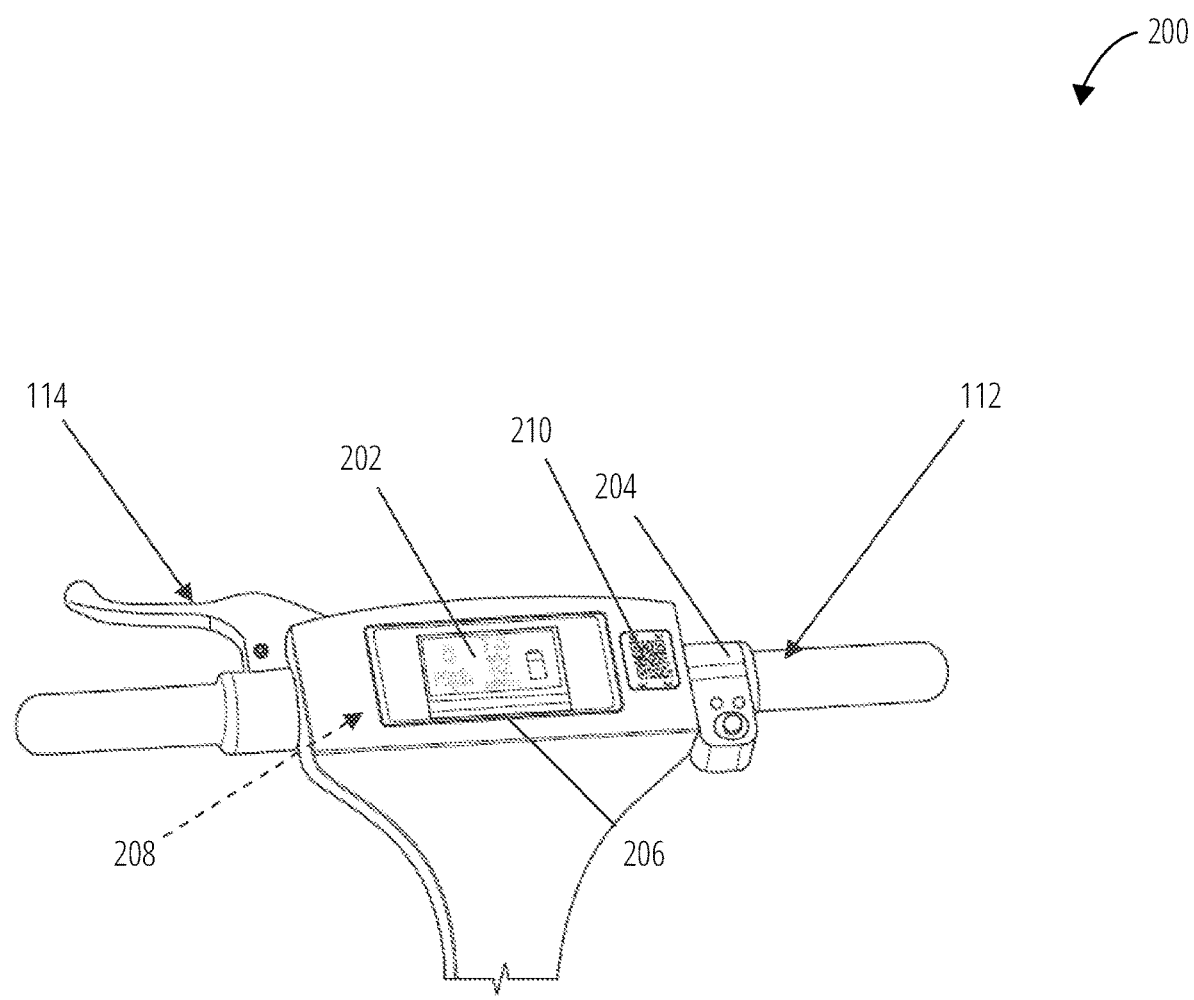
FIG. 2 is a detail view of the controls of a safety integrated electrically powered vehicle disclosed herein, showing the user control interfaces.
Figure 3:
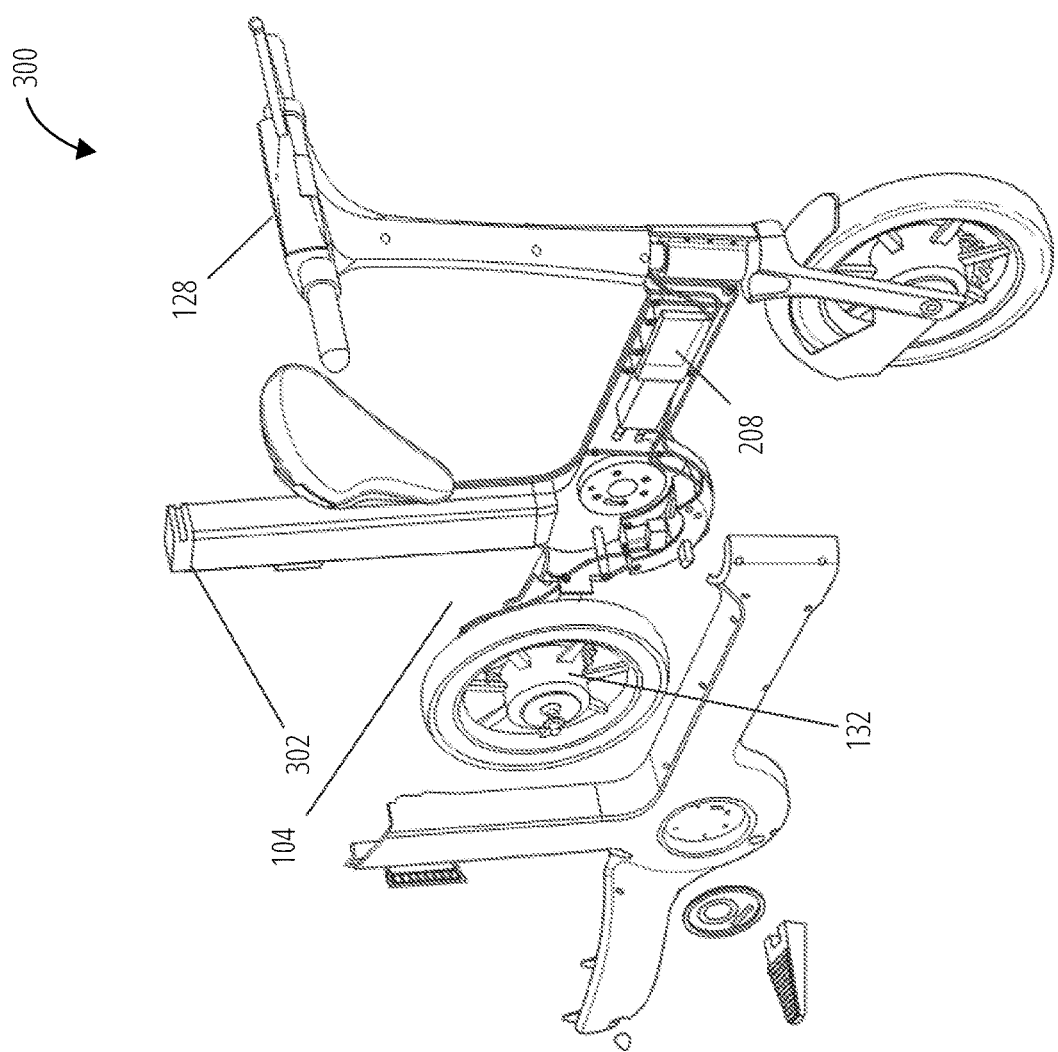
FIG. 3 is a cutaway of the safety integrated electrically powered vehicle disclosed herein, showing electrical. Mechanical, and system components.
Figure 7:
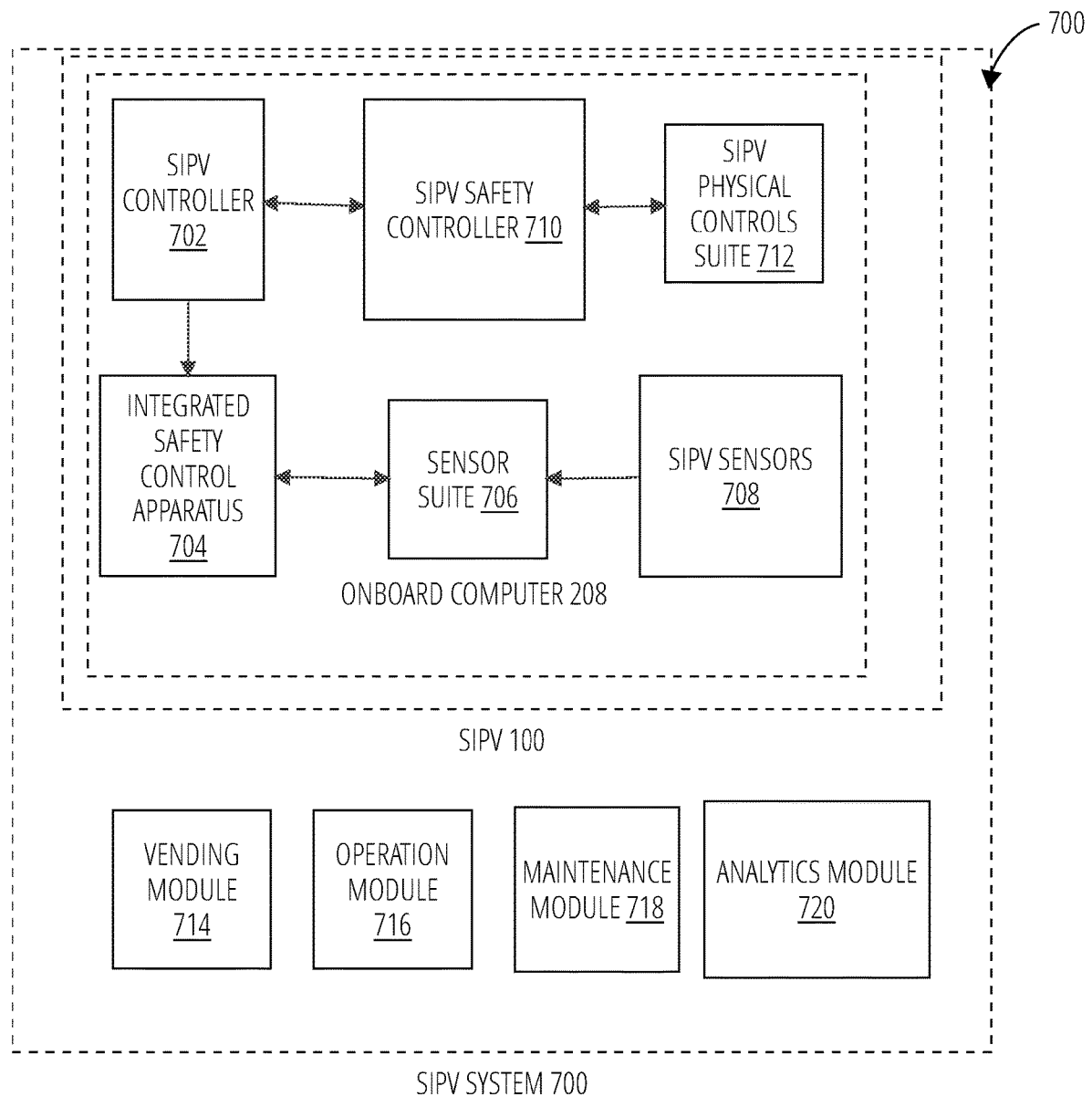
FIG. 7 is a functional diagram of the SIPV system and its interaction modules with the SIPV.

In FIG. 2, the handle 110 further comprising a mounting for an acceleration control 112, a braking control 114, a display 202 of SIPV 100's (BLE, cell, WiFi) network connections, status, location, other informatics, displaying data received from an onboard computer 208 (functionality further described in FIG. 3 and FIG. 7 mounted beneath the display 202, or down in the frame 102 (the second option is shown in FIG. 3), turn signal control 204 and an antenna 206 for communication to the SIPV system 700 as introduced in FIG. 7. Turn signal control 204 is also linked to light 128 to indicate SIPV 100 turning by the user. Another aspect of the solution shown is rider authentication apparatus 210 which is shown on as a QR code symbol in the written description, but could be accomplished with RFID technology, Bluetooth, Near Field Communications, or other device pairing technologies to allow a user to quickly authenticate and purchase a ride on the SIPV 100.

In FIG. 3. shows an exploded view of the SIPV 100 is shown the substantially rigid frame 102 further comprising: a power source 302 powering a drive apparatus 132 further comprising: at least a drive apparatus 132 driving at least one of the wheels 104; a rider authentication apparatus 128; an acceleration control 112 linkage to the drive apparatus 132 for starting, maintaining, and decreasing movement of the SIPV 100 responsive to commands from a user input from the handle mounted controls (112 or 114) or from a SIPV system 700 or the onboard computer 208 to correct a detected unsafe condition. The drive apparatus 132 further comprises a motor, a power linkage to the power source, a communication linkage to the SIPV system 700 (FIG. 7) and mechanical linkage to the wheel 104 that the drive apparatus 132 is driving. For the sake of clarity, the motor may directly drive the wheel hub 116 or indirectly drive the wheel via chain/sprocket/drive shaft/transmission/or other indirect drive means.

Figure 4:
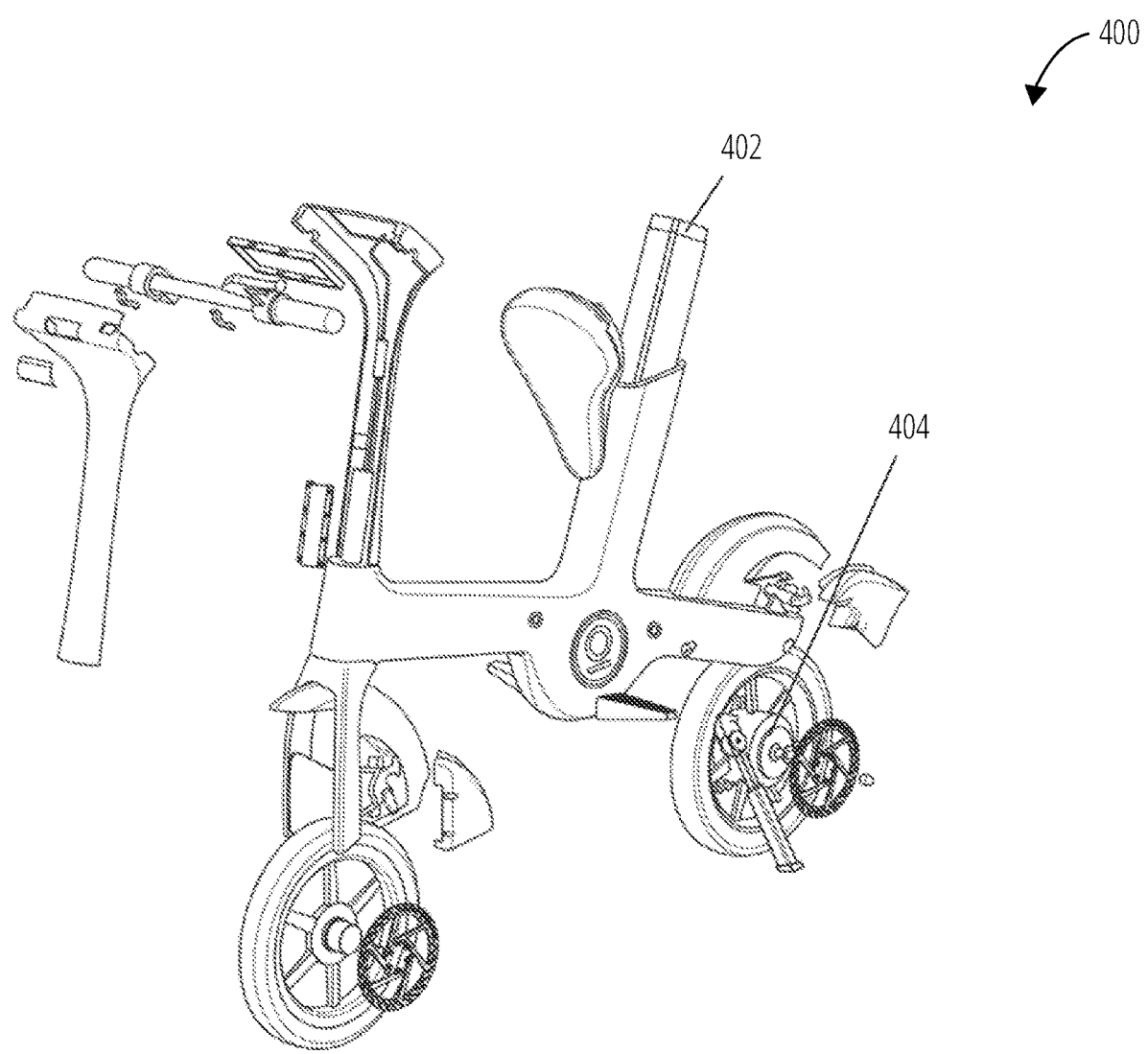
FIG. 4 is an exploded view of the safety integrated electrically powered vehicle disclosed herein, showing safety attributes as well as other vehicle components.

In FIG. 4, the SIPV 100 is also operably linked to a brake 130, the drive apparatus 132 and the energy power source 302; a control linked to light 128 for signaling vehicle turns or braking (light 128 includes locations on the back and sides of the SIPV 100 for the sake of clarity). This SIPV 100 linkage is in addition to mechanical inputs from a user input from the handle brake control 114 or a turn signal control 204 coupled to a brake or turn indicator, respectively. The SIPV 100 wirelessly coupling to a safety device 138 (e.g. a helmet in this variant) via the safety linkage 136 that is also connected to the SIPV 100 to monitor for user safety. This safety linkage 136 is further connected to the SIPV system 700 for transmission of other safety related data to the SIPV system 700 for other data management processes. The safety data that is interwoven into the safety solution integral to this SIPV 100 comprises: Tire pressure or weigh on wheels 104 are used to detect safe driving conditions as well as safe loads (i.e. more riders than SIPV 100 can handle. A seat sensor 402 interlinked with the power source 302 to establish that a user is in place on the seat 108 prior to allowing the SIPV to move. A Bump sensor 404 allowing the SIPV 100 to identify unsafe driving (e.g., riding on sidewalks and other unsafe terrain.) Other combinations of tire pressure data, bump sensor working in conjunction with the speedometer can identify unsafe speed and loads on the rigid frame 102. The SIPV 100 roll, yaw and pitch positions as well as SIPV 100 angle and orientation is provided by gyroscopic sensed data to estimate SIPV operational status, detect accidents or other impacts on the SIPV, detection of uphill travel to increase power to drive apparatus, detection of downhill travel to establish system braking or power recovery protocols to keep SIPV from exceeding safe decent speeds. Integration with accelerometer/speedometer data also provides significant data for the SIPV 100 and SIPV system 700 to detect, intervene if necessary, and transmit instructions to drive motor and braking performance. Servicing protocols are extracted from motor, brake and power sources. (e.g., the power source 302 reports its charge status and usage. Although not explicitly a sensor, speakers/horns, displays and head lights/signal/telltale lights all are used to cue the rider of safety issues, warning the rider visually, aurally, or haptic notice of a safety issue. Finally, in the variants of this solution where at least a camera/video device is mounted in the SIPV 100, such that the visual detection of surroundings or items is also integrated into a safety scenario and forensic event recording. The camera can be uses to collect ride surroundings on a continuous basis to create the equivalence of a flight recorder and stream ride data to the SIPV system 700 during a ride for diagnostic purposes.

For the sake of clarity, the SIPV 100 comprises electric bicycles, electric mopeds, electric scooters and can further comprise any/all electric mobility vehicles having up to three wheels that are powered by an electric motor and primarily get their energy from the power grid—in other words: an EV that can be recharged or powered externally. This includes purely electric vehicles, vehicles that assist human power with electrical power assistance (e.g. pedaled), vehicles with a combination of electric motor and a small combustion engine (range extended electric vehicles—REEV), and hybrid vehicles that can be recharge via the power grid (plug-in hybrid electric vehicles—PHEV.

Figure 5:
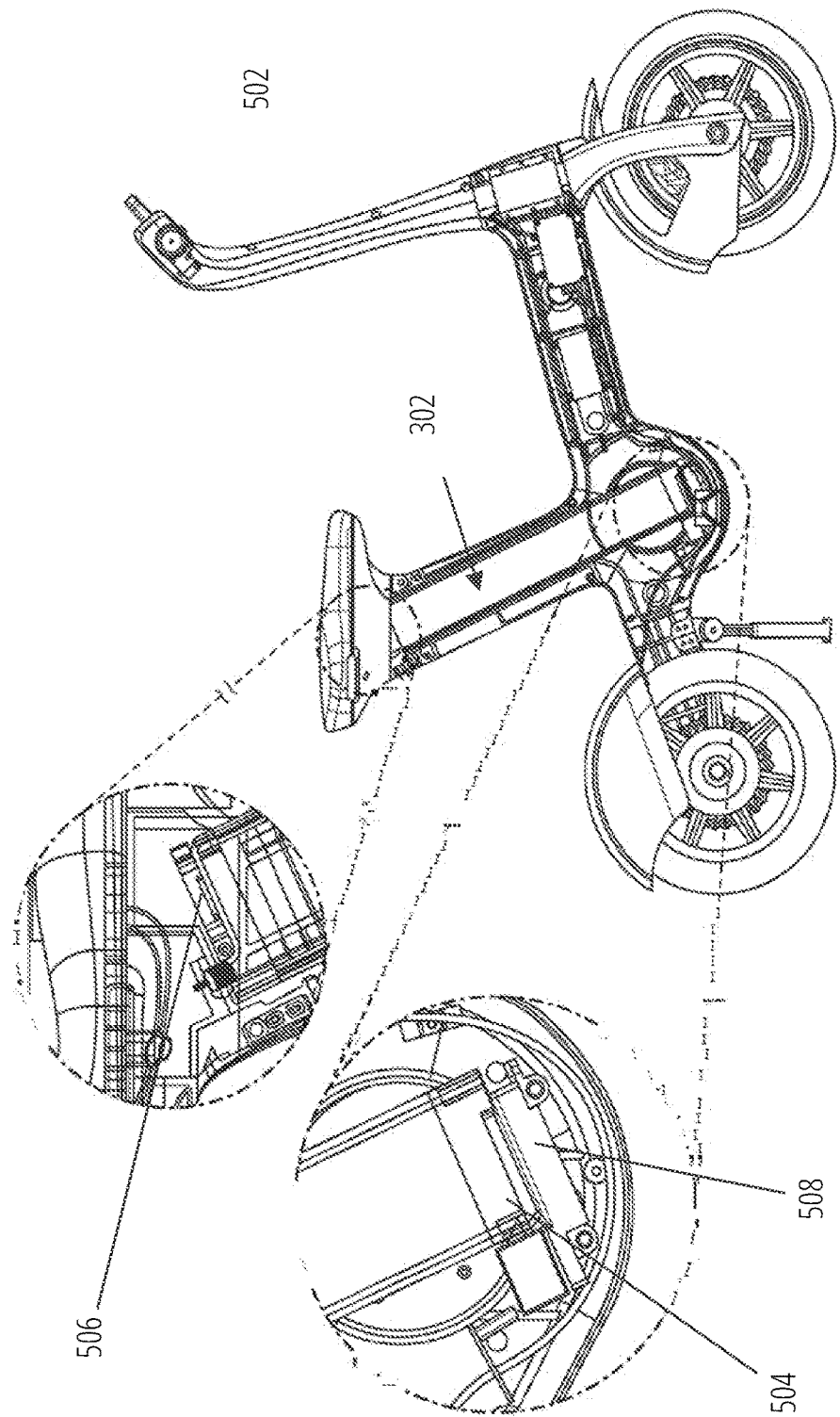
FIG. 5 is a cutaway of the safety integrated electrically powered vehicle disclosed herein, showing power and sensor safety features.

In FIG. 5 a cross-sectional view of the SIPV 100 further comprises a power source 302 that allows a rapid replacement by service personnel further comprising with safety and security interlocks that keep the SIPV 100 safer from vandalism and other threats. The power source 302 uses the seat sensor 402 that interacts with the SIPV 100 to determine if a rider is present on the seat 108 prior to the ride on the SIPV 100 allowing the drive apparatus 132 to be engaged. Power source 302 as defined in this solution includes electrical storage devices like batteries or active electrical generation devices like fuel cells that provide an electrochemical cell that converts the chemical energy of a fuel (often hydrogen) and an oxidizing agent (often oxygen) into electricity through a pair of redox reactions.

As shown in FIG. 5, a power source 302 having compatible dimensions for seating inside a SIPV seat post 126 is inserted into of the SIPV 100 with the power source connector end 504 of the power source 302 inserted first. A solenoid latch 506 is pressed out of the way as the power source 302 is inserted into the seat post 126 and then the solenoid latch 506 then re-extends once the power source 302 is fully inserted, locking the power source 302 into the seat post 126 When the power source 302 is fully inserted into the seat post 126, the power source connector end 504 engages with the power source connector receptacle 508 located at the bottom of the seat post 126. Once the power source connector receptacle 508 connected with the power source connector end 504, the power source 302 powers the SIPV 100 and its respective vehicle control and authentication systems control (112,114,210,) thereby allowing Bluetooth Low Energy or the equivalent communications with the (SIPV 100 or the SIPV system 700) and the onboard computer 208 enabling control of the solenoid latch 506. Servicing of the power source 302 is then enabled allowing the solenoid latch 506 to be triggered by a mobile device application via Bluetooth Low Energy (BLE) link with solenoid latch 506. Once unlatched, the power source 302 is removable. The SIPV system 700 can also trigger the solenoid latch 506. Using the mobile device application, a maintenance command to unlock and remove the power source 302 is sent via BLE to the onboard computer 208 that issues a command to the solenoid latch 506 via a digital bus. This digital bus can be a CAN bus or UART or other digital bus formats. As mentioned above, the power source 302 further comprises a seat sensor 402 comprising an integrated force-sensitive resistor drive circuit or its equivalent, which allows detecting the presence of a seated rider. Additionally, the power source 302 can also receive a deactivate command via BLE from a service technician, the SIPV system 700 or the onboard computer 208 if a disable requirement exists. (e.g.; SIPV is stolen or damaged)

The present solution power source 302 provides for mass servicing of SIPV 100, where a maintenance mobile device can simultaneously unlock multiple solenoid latch 506 on multiple SIPV 100 via BLE. This facilitates mass servicing and tracking of power source 302 conditioning and other operational or service metrics for the SIPV system 700 to perform optimization or analytics upon. In the event of a power source 302 being drained in the field and the solenoid latch 506 is in an unpowered state, the power source 302 further comprises a power access port that enables a technician to power the solenoid latch 506 and allow the removal of the power source 302 event when the power source 302 is unpowered. Additional safety considerations in the present invention's power configurations further comprise keeping the SIPV drive apparatus 132 unpowered until a power-up procedure dictated by the onboard computer 208 is followed that includes the use of the safety device 138. The power source 302 further comprises a digital displayed of remaining capacity that is displayed either at the power indicator 134 or on the display 202. The power source 302 can be populated with a variable number of power cells/fuel cells to save weight and cost, or to comply with local regulations.

Figure 6:
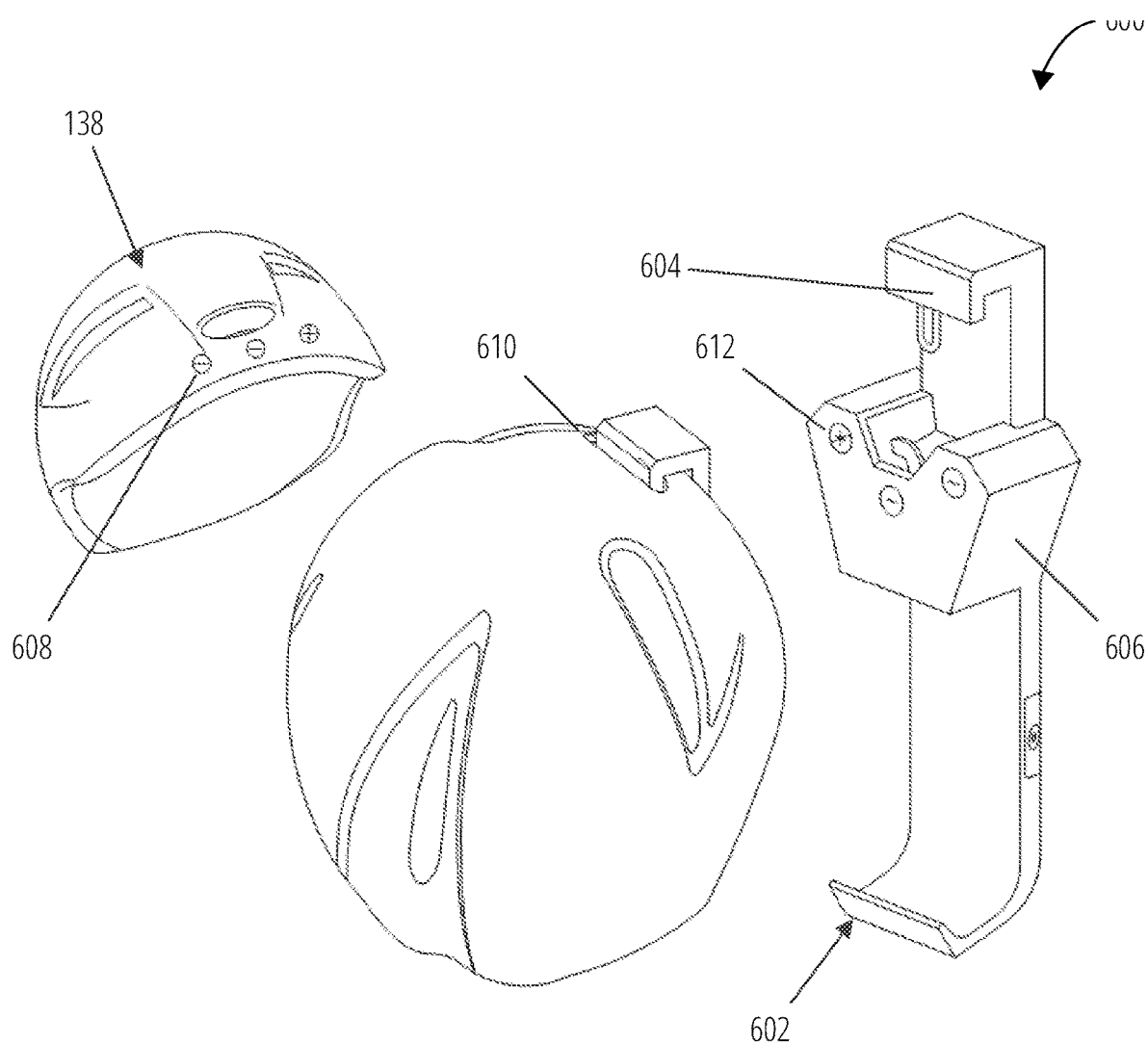
FIG. 6 is an example of a connected safety device and its mounting clip that is mounted on the safety integrated electrically powered vehicle.

FIG. 6 displays a variant of the safety device 138 and its Mounting Clip 602 where it may be mounted on a SIPV 100. There are many places that the safety device 138 can be mounted on a SIPV 100 and the various mounting variants of this solution are largely due to aesthetics. The primary reason for this is to allow the SIPV 100 to operate with the safety device 138 and Mounting Clip 602 mounted in a manner that does not interfere with safe operation. This variant of the solution's safety device 138 deployment features a Mounting Clip 602 where the Safety device 138 has a number of clip indents or a Safety Device Retention Slot 610 that fit with a Safety device retainer 604 as the safety device 138 is placed into the base of Mounting Clip 602 and placed up into positions such that the Safety device retainer 604 can be moved into position where the Latching module 606 will actuate to lock the device into place. The Latching module 606 further comprises a local wireless connection to the onboard computer 208 and reports out that the latch is closed as well as confirming a near distance link between a Safety device sensor 608 mounted in the safety device 138 and a Mounting latch sensor 612 located in the Latching module 606. One variant of this solution would carry permanent magnets to create a magnetic field that hall sensors emplaced in the safety device 138 can use to detect a helmet presence. There are a number of variations of this configuration, but the basic aspect of the deployable safety device 138 is that it is contained in the SIPV 100 and is deployed when the ride is purchased and recovered to the SIPV 100 and verified retrieved to the SIPV system 700. The deployment of this safety device 138 typically is deployed once a user orders a SIPV 100 ride using a user mobile device. Upon validation of payment, the Latching module 606 receiving an unlocking command from onboard computer 208 or from the user mobile device if an app is used to generate an unlocking command. The solution contemplates either unlocking/retrieval methodology.

System Network Overview

Several network types of controllers maybe used in this solution comprising individual or hybridized networks. One variant of the solution further comprises a CAN bus as shown in FIG. 6, is one of these central networking protocols used in vehicle systems without a host computer. CAN is an International Standardization Organization (ISO) defined serial communications bus originally developed for the automotive industry to replace the complex wiring harness with a two-wire bus. The specification calls for high immunity to electrical interference and the ability to self-diagnose and repair data errors. These features have led to CAN's popularity in a variety of industries including building automation, medical, and manufacturing. The CAN communications protocol, ISO-11898: 2003, describes how information is passed between devices on a network and conforms to the Open Systems Interconnection (OSI) model that is defined in terms of layers. Actual communication between devices connected by the physical medium is defined by the physical layer of the model. The ISO 11898 architecture defines the lowest two layers of the seven layer OSI/ISO model as the data-link layer and physical layer. By connecting all the modules in a vehicle to one central line, the control system is simplified and more easily regulated. This design allows any connected module to alert the main controller to an event that as it occurs which will cause the rest of the system to respond accordingly. The shared data line allows multiple modules to be attached with less invasive efforts, making the potential for error much lower. If one module on the CAN bus fails, it does not necessarily cause the failure of other modules. Unless the two systems are directly related, and one cannot run without the other, the healthy modules will continue to function perfectly despite the loss of one bad module. This makes the entire system safer. Additionally, diagnostics of the SIPV 100 are simpler and more specific due to the specialized and self-contained nature of the modules. Diagnostics can now pinpoint the exact cause of the module failure with accuracy and speed. When one module needs maintenance, that module can simply be targeted and replaced rather than tearing apart the entire vehicle. CAN bus offer a simple interface for attaching an additional node in the present solution. Each of the nodes can be used for diagnostics, reprogramming, monitoring, and more. The utility of these module nodes can be seen in the SIPV system 700. SIPV 100 comprising at least an integrated safety control apparatus 704 wherein the integrated safety control apparatus 704 polls a sensor suite 706 further comprising plurality of sensor measured data parameters of the present SIPV that are selected from a group of tire pressure, seat occupancy, helmet worn, helmet missing, speedometer, accelerometer, GPS location, image capture, video streamed, user input commands, bump detection, SIPV pitch/roll/yaw orientation, battery status, motor status, rental status) from the currently active SIPV 100. This plurality of data is converted by the integrated safety control apparatus 704 into parameters related to safe use by a rider, a communication link to a SIPV safety controller 710 to transmit the parameters related to safe use by a rider on a SIPV, and at least an instruction received from the SIPV safety controller 710 via the communication link to direct a plurality of control units controlled in the SIPV physical controls suite 712 to modify current operation parameters (e.g. Applying a brake, reducing acceleration, cutting power, actuating signals and tones in the SIPV 100 (e.g. commanding compliance via the display 202) in a manner to bring the SIPV back to a safe use. The SIPV system 700 may also take over and slave the SIPV controller 702 if the data received from the present SIPV warrants the use of a redundant control of the SIPV. For clarity, the SIPV controller 702 may also reside externally to the SIPV 100 in this solution as well. As further demonstrated in FIG. 7 the SIPV system 700 further comprises a Vending Module 714, which handles authentication of a user, the validation of the payment method provided, provision of authorization for the user rental of a SIPV 100; an Operation Module 716 which handles the operational monitoring and control of the SIPVs 100 managed by the SIPV system 700 and manages the activation or disabling commands of SIPV 100 that are under its control.

SIPV system 700 can also be characterized as a part of a network of SIPVs 100*s* interconnected via several network types comprising cloud, cellular, wireless, mesh or CAN bus network either using Virtual Machines or other processor hardware to create a system grouping.

Mesh Network

Figure 8:
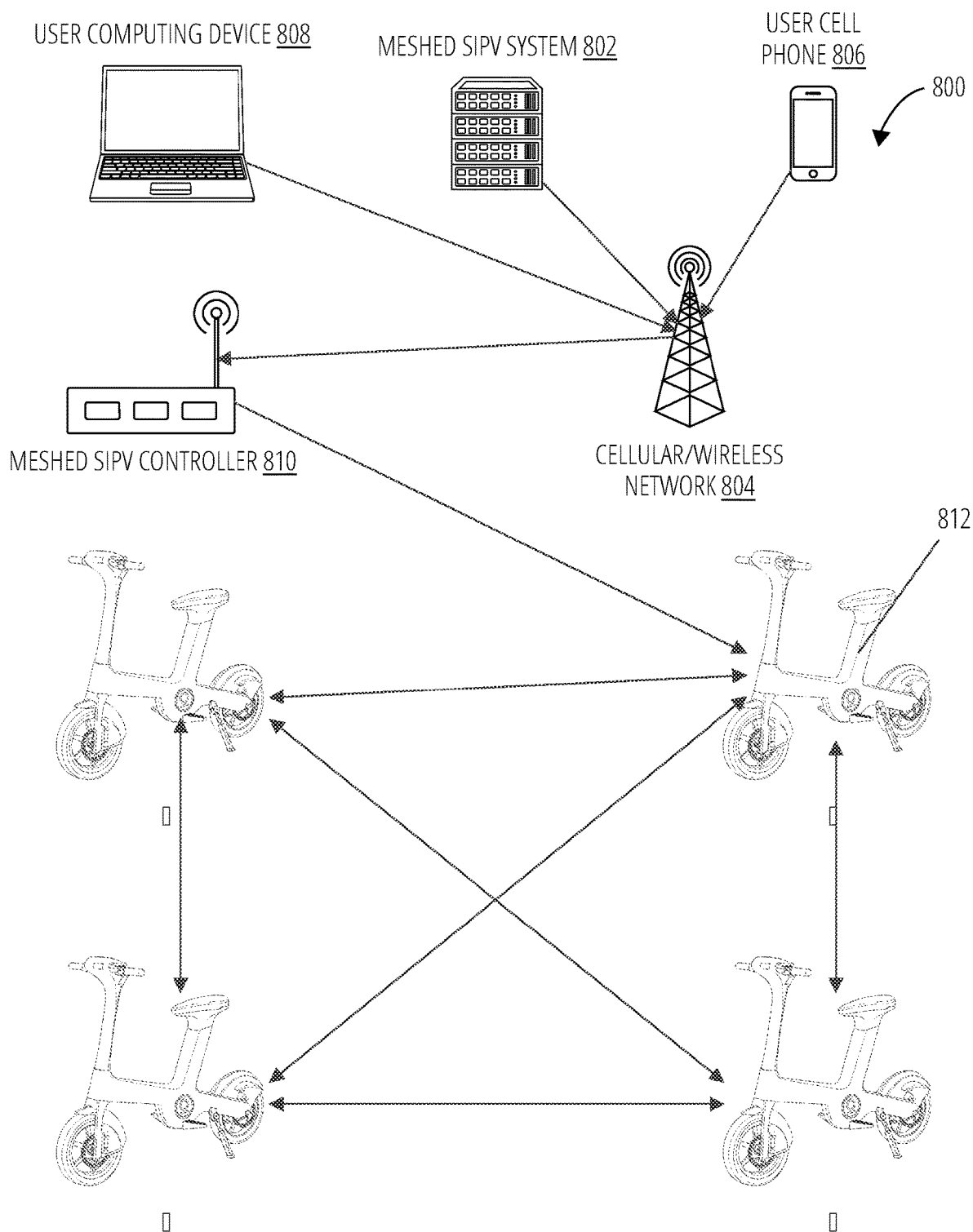
FIG. 8 is the SIPV Mesh Network example of the safety integrated electrically powered vehicle disclosed herein.

A mesh network (or simply mesh-net) as shown in FIG. 8 is a local network topology in which the infrastructure nodes (i.e. bridges, switches and other infrastructure devices) connect directly, dynamically and non-hierarchically to as many other nodes as possible and cooperate with one another to efficiently route data from/to clients. This lack of dependency on one node allows for every node to participate in the relay of information. Mesh networks dynamically self-organize and self-configure, which can reduce installation overhead. The ability to self-configure enables dynamic distribution of workloads, particularly in the event that a few nodes should fail. This in turn contributes to fault-tolerance and reduced maintenance costs. Mesh topology may be contrasted with conventional star/tree local network topologies in which the bridges/switches are directly linked to only a small subset of other bridges/switches, and the links between these infrastructure neighbors are hierarchical. The Meshed SIPV Network 800 comprises a meshed SIPV system 802, that is operably connected with aa wireless network 804 as disclosed above, the Meshed SIPV Network 800 in operable communication with at least one, (a user cell phone 806, or a User computing device 808) the meshed SIPV system 802 delegating operations, monitoring or other computing tasks to at least a meshed SIPV controller 810. The meshed SIPV controller 810 then in operable communication with at least a meshed SIPV 812. The meshed SIPV 812 is also in operable communications with other meshed SIPV 812 as well other meshed SIPV controller 810 if the working area of a meshed SIPV system 802 is larger than the practical range of a single mesh meshed SIPV controller 810. A useful configuration of a meshed SIPV 812 interaction would be to use idle meshed SIPV 812 for computing power as they are out of service. Additionally, active in-use meshed SIPV 812 should be aware of and monitoring other meshed SIPV 812 around their communication area to help co-locate the meshed SIPV 812 of interest. Additionally, integration with the user cell phone 806 and the wireless network 804 to continue to assist in triangulation problems where a particular meshed SIPV 812 was last connected. For the sake of clarity, the use of wireless network 804 and user cell phone 806 would work in the other network types used in the present solution, it is not intended that this functionality only exist in the Meshed SIPV Network 800 example.

Figure 9:
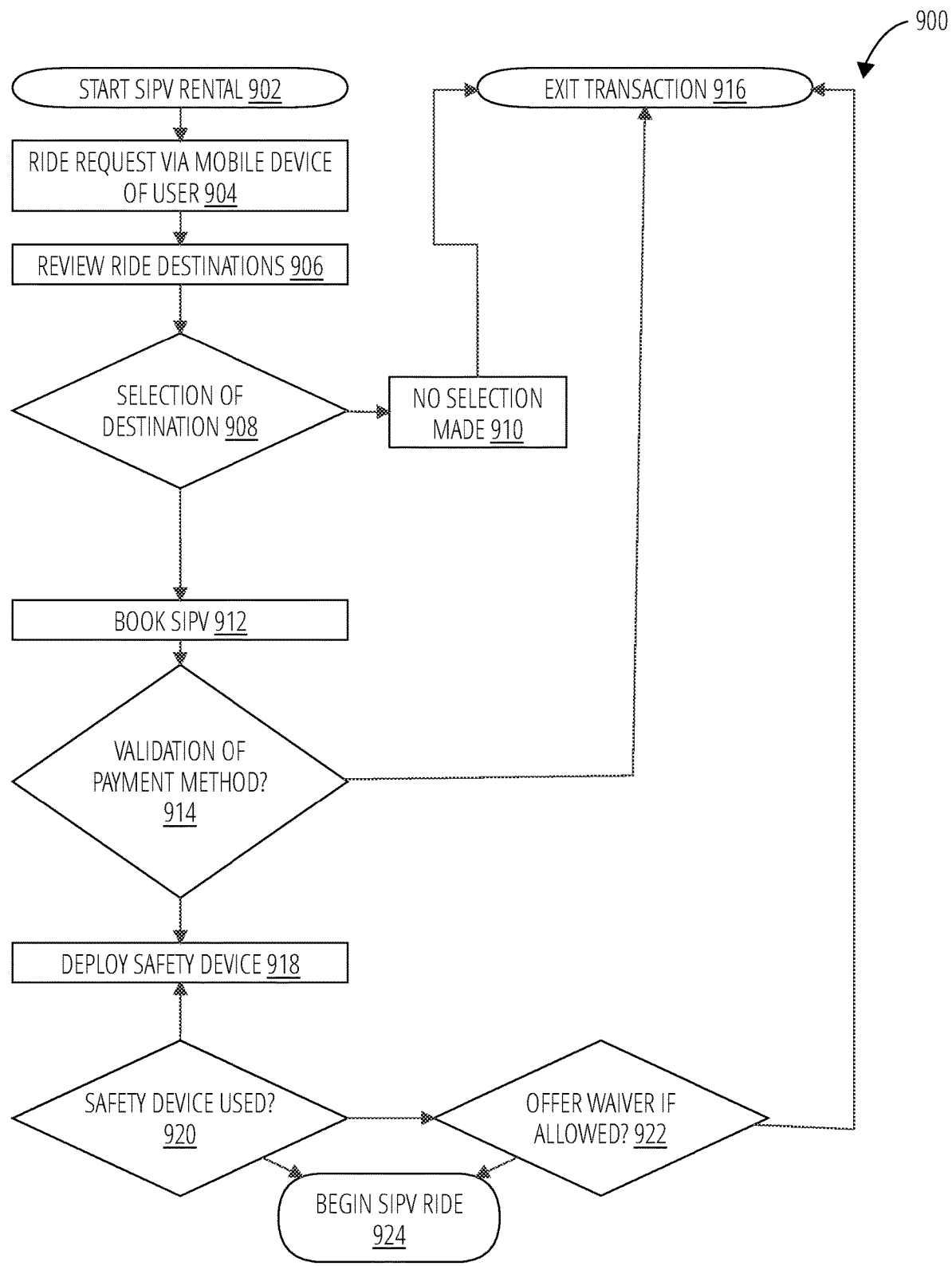
FIG. 9 illustrates an Initiation of SIPV ride in accordance with one embodiment.

A typical SIPV rental process 900 is outlined in FIG. 9, The SIPV rental process 900 comprises a Start SIPV Rental 902 step, where a particular SIPV 100 is identified for a rental, The user wanting to ride that SIPV 100 makes a Ride request step via mobile device/computing device of user step 904. where a potential user would use their mobile device to rent a particular SIPV 100 (e.g., by using a QR code or an app that accomplishes the same usage), Selection of Destination 908 is made after the user makes a Review ride destinations 906 step. In the alternative, the user can simply rent the SIPV without selecting a destination and the SIPV will simply limit the ride to general service area). Once a Selection of Destination 908 step has been made, the user will finalize the step of Book the SIPV 912, which further comprises aa Payment Authorization 914, and then to ultimately an Exit Transaction 916 step. This booking step will in turn cause the Deploy Safety Device 918 step releasing a safety device 138 to the renting user, the SIPV 100 will validate that the safety device 138 is working and in place completing a Safety Device Working and Used 920 step. If the user does not use the safety device 138 and it is permitted by law, a Wavier of Liability 922 step is initiated, requiring the user to return the safety device 138 to the Latching module 606. Once the safety device 138 is restowed and latched into place, the waiver can be signed by the user and finalized to bring the SIPV ride ready at the Finish SIPV rental 924 step.

Figure 10:
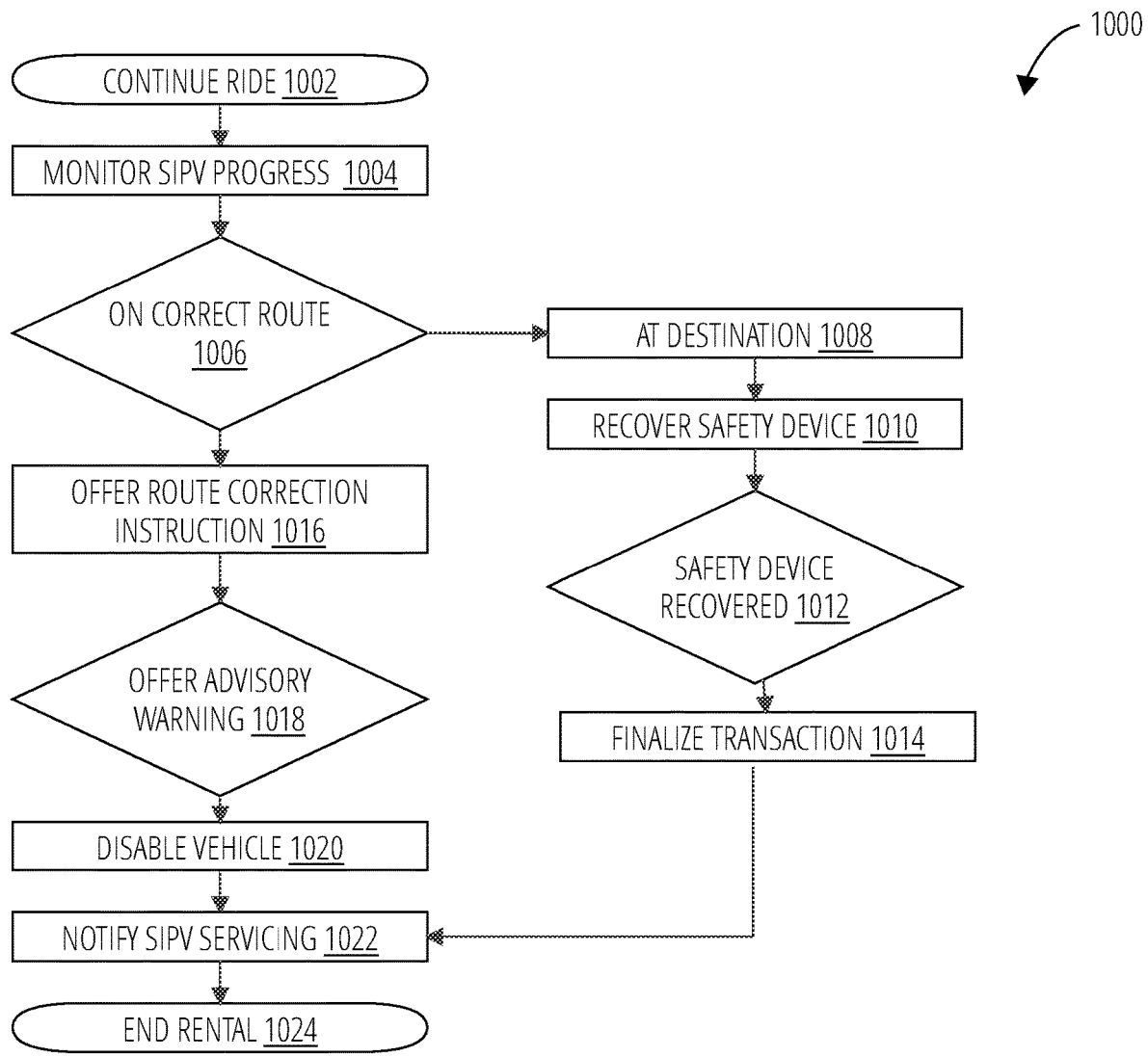
FIG. 10 illustrates a safety process during SIPV rental in accordance with one embodiment.

The Safe Ride Flowchart 1000 is shown in FIG. 10 comprises a Continue Ride 1002 step where a user begins a ride on the SIPV 100 and the various safety systems support the ride with ongoing monitoring, a Monitor SIPV progress 1004 step simply monitors the ride and compares any known parameters for the ride. If the SIPV is on an On Correct Route 1006 step and no other safety alerts are generate, the SIPV takes no actions, gives no alerts until the SIPV 100 arrives at an At Destination 1008 step, and a final position of the SIPV 100 is established and also where recovery of the safety device 138 begins. During a Recover Safety Device 1010 step, the user is prompted to remove a liner inside the safety device 138 and to return it to the Safety device retainer 604 and to lock the safety device 138 into the mounting clip and to lock it. The SIPV 100 broadcasts a recovery signal to the SIPV system 700 and the SIPV validates that a Safety Device Recovered 1012 step has been completed. After that step, a Finalize Transaction 1014 step is completed, the final Payment Authorization 914 is completed, and the ride is over. However, if a user is using the SIPV unsafely, another process loop initiates to cause a Route Correction 1016 step to be generated once the SIPV 100 moves off a target area serviced by the SIPV system 700. In addition to this step, a number of other warnings can be offered (e.g. an overweight ride, illegal sidewalk riding, driving down one way streets backwards, other SIPV 100 riding behaviors that the SIPV system 700 wishes to prohibit) The SIPV 100 then pushes out, an Offer Advisory Warning 1018 step that gives that user a warning to return to an approved route or local or suffer a disabled SIPV 100. Once a warning has been ignored, a Disable Vehicle 1020 step is engaged. Once the Vehicle has been disengaged, a Notify SIPV servicing 1022, step is made telling the servicing team to go retrieve a SIPV 100 and return the disabled SIPV 100's onboard computer 208 to a Rental 1024 state.

Bluetooth Authentication

The present solution uses Bluetooth to interact and pair a user to a particular shared ride rental and the user's mobile device. Bluetooth is a popular standard for close-range wireless communication. It provides the ability to pair two devices together and thereby exchange information with each other. An example of the authentication mechanism utilized by Bluetooth devices is described below. The pairing process, also known as the standard pairing, requires the two devices (user mobile device and the SIPV 100) establish an initial symmetric key in order to communicate securely. In this case there are two devices, a user mobile device and SIPV 100 being rented. The two devices at first handle two keys, share a PIN and know each other's 48-bit Bluetooth device address (BD_Addr). The first key is the symmetric initialization key (Kinit) to mutually authenticate each other and the second is a link key. The link key is generated during the pairing session with the help of the initialization key. The 'Unit key' is generated when the device is first operated with the help of the key generation algorithm. The 'Initialization key' is needed when two devices need to communicate with each other. It is used for exchanging link keys and for encryption as well as decryption of information during the link key generation protocol. The 'Link key' can be used in two different methods. The devices' unit key can be sent with encryption of the initialization key and this would constitute a link key or the device can generate a random number and then send it under the encryption of the initialization key and thereby generate a link key. The 'Combination key' is generated during the Initialization process at the same time and is only valid for the session only. This key is exchanged when the two devices compute their link keys. It comprises of a 128 bit random number and the Bluetooth device address. The 'Encryption key' is generated from the current link key during the authentication process. It is based on the COF (96 bit Ciphering Offset Number). The 'Master key' is generally used as the link key if the master needs to transmit to multiple slaves. It is generated using the key generation algorithm by virtue of the 128 bit random number. The resultant link key is then sent to the slave, bitwise xored with overlay. With this, slave can compute master key.

Bluetooth Pairing Mechanism

At the onset initially both the devices share a low-entropy human-readable secret PIN. Typically the PIN comprises of a 4-digit code, which can be up to 128 bits When device 1 initiates the connection it is referred to as the initiating device and it does so by generating a random nonce (number used once) n1, and then sending it to device 2. Both devices then compute a shared initialization key Kinit using the E22 algorithm. The key Kinit is a function of n1, BD_Addr1, and PIN.

Device Authentication

After the shared key generation, the two devices authenticate each other before generating the encryption key. It is based on the challenge response scheme. The verifier (device 2) sends a plain-text random value AV_RAND2, the receiver (device 1) then computes a response SRES=E1 (Kinit, BD_Addr1, AV_RAND2) where E1 is the algorithm. The verifier performs the same calculation and compares the response to the verifier. After the verification, a match is required for the mutual authentication process to be successful.

Bluetooth Encryption

The Bluetooth mechanism involves the use of block cipher algorithm for encryption and Link Key generation. Further, the encryption of packets is performed using a stream cipher and 4 linear feedback shift registers. After authentication, a cipher key K3 is generated. The key length is 128 bits to ensure high level of security. After the key is generated, the data payload is encrypted using the cipher stream engine E0 and takes as inputs the encryption key, BD_Addr, 128 bit random number and the 26 LSB of the master's clock. The input values are shifted into four linear feedback shift registers and then combined in the summation combiner FSM to produce the cipher. This generates a new cipher every time.

The above description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A safety integrated electrically powered vehicle (SIPV) apparatus comprising: an electric vehicle further comprising exactly two wheels and at least an integrated safety control apparatus wherein the integrated safety control apparatus polls a plurality of sensors comprising at least a video feed sensor, a balance condition sensor and an electrical sensor on the electric vehicle to detect a current set of operation data related to the electric vehicle's safe use;
 a communication link to the integrated safety control apparatus on the electric vehicle to transmit a plurality of data representative of the current use of electric vehicle; and
 receive from a SIPV system at least an instruction received by the integrated safety control apparatus via the communication link to direct a plurality of control units on the electric vehicle to modify the current set of operation data to bring the electric vehicle back to a preselected set of operation data selected by the SIPV system.

2. The SIPV apparatus of claim 1 wherein the electric vehicle further comprising a receipt of an instruction from the integrated safety control apparatus located on the electric vehicle to push an alert to a user of an unsafe use parameter selected from the current set of operation data.

3. The SIPV apparatus of claim 1 further comprising receipt of an instruction from the integrated safety control apparatus located on the electric vehicle to a braking control unit on the electric vehicle to activate a brake on the electric vehicle in response to an unsafe use parameter selected from the current set of operation data conditionally with the balance condition sensor.

4. The SIPV apparatus of claim 1 further comprising receipt of an instruction from the integrated safety control apparatus located on the electric vehicle to a drive apparatus on the electric vehicle to change a drive apparatus speed parameter on the electric vehicle in response to an unsafe use parameter selected from the current set of operation data conditionally with the balance sensor.

5. The SIPV apparatus of claim 1 further comprising receipt of an instruction from the integrated safety control apparatus located on the electric vehicle to a power control unit on the electric vehicle power source to change a power parameter on the electric vehicle in response to an unsafe parameter selected from the current set of operation data conditionally with the balance sensor.

6. The SIPV apparatus of claim 1 further comprising receipt of an instruction from the integrated safety control system to activate a camera located on the electric vehicle to record the surroundings of the electric vehicle and transmit further data to the SIPV system via the communication link.

7. The SIPV apparatus of claim 1 further comprising a sensor suite on the electric vehicle that polls the plurality of sensor measured data parameters of the electric vehicle as selected from a group of parameters, an electric vehicle tire pressure, an electric vehicle seat occupancy, a user helmet worn, SIPV a user helmet missing, an electric vehicle speedometer readings, an electric vehicle accelerometer readings, an electric vehicle GPS location, an electric vehicle camera image capture, an electric vehicle video streamed, an electric vehicle bump detection, an electric vehicle pitch/roll/yaw orientation, an electric vehicle current battery status, an electric vehicle drive apparatus status, an electric vehicle rental status.

\* \* \* \* \*